United States Patent [19]

Mizobe et al.

[11] Patent Number: 4,968,561
[45] Date of Patent: Nov. 6, 1990

[54] SYNTHETIC FIBER FOR USE IN REINFORCING CEMENT MORTAR OR CONCRETE AND CEMENT COMPOSITION CONTAINING SAME

[75] Inventors: Akio Mizobe; Masaki Okazaki; Mitsuro Mayahara; Junichi Yoshinaka, all of Okayama, Japan

[73] Assignee: Kuraray Company Limited, Okayama, Japan

[21] Appl. No.: 177,083

[22] Filed: Apr. 4, 1988

[30] Foreign Application Priority Data

Apr. 10, 1987 [JP] Japan .................................. 62-89627

[51] Int. Cl.$^5$ .......................... C04B 7/02; D02G 3/00
[52] U.S. Cl. .................................. 428/397; 428/359; 428/364; 524/4
[58] Field of Search ............... 428/364, 375, 359, 357, 428/397; 106/90, 99; 264/185, 205, 211, 128

[56] References Cited

U.S. PATENT DOCUMENTS 4,524,042  6/1985  Genba et al. ..................... 106/90 X
4,603,083  7/1986  Tanaka et al. ................... 264/210.8
4,765,937  8/1988  Hyon ................................. 264/185

Primary Examiner—Lorraine T. Kendell
Attorney, Agent, or Firm—Oblon, Spivak, McClelland, Maier & Neustadt

[57] ABSTRACT

A synthetic fiber suited for use as a reinforcement for cement mortar or concrete as derived from monofilaments having a tensile strength of not less than 80 kg/mm$^2$, Young's modulus of not less than 2,300 kg/mm$^2$, a flat cross section in which the minor axis-to-major axis ratio is 1:2 to 1:10, and a fineness of 1,000–9,000 denier, and being cut to a fiber length such that the aspect ratio (the value obtained by dividing the fiber length by the diameter of a circle equivalent in area to the cross section of the fiber) amounts to 20–150, in particular a polyvinyl alcohol fiber having the above-mentioned characteristic features, shows good dispersibility in cement mortar and produces very good reinforcing effect. Materials of construction which are excellent in workability and postcure strength can be obtained by incorporating the above-mentioned fiber to cement and the like.

2 Claims, No Drawings

SYNTHETIC FIBER FOR USE IN REINFORCING CEMENT MORTAR OR CONCRETE AND CEMENT COMPOSITION CONTAINING SAME

BACKGROUND OF THE INVENTION

1. Field of the Invention

This invention relates to a synthetic fiber, in particular a PVA fiber, showing good reinforcing property when added to a hydraulic substance such as cement. It also relates to a material of construction as obtained by incorporating said synthetic fiber into a hydraulic substance and having good workability and reinforcing property.

2. Description of the Prior Art

Moldings made of a hydraulic substance such as cement mortar or concrete are brittle bodies and are therefore disadvantageous in that they have very low flexibilitiy, that they are readily broken or cracked when a tensile or bending force is applied thereto, and that they are poor in shock resistance. To remove these drawbacks, steel reinforcements or skeletons are combinedly used. It is also known to reinforce such moldings by addition of various kinds of fiber.

Previously, the present inventors proposed a technique of remedying such drawbacks of cement and concrete (hereinafter referred to "mortar and the like" for short) as described in Japanese Kokai Tokkyo Koho (Published Unexamined Patent Application) No. 8664/84. Subsequent investigations, however, revealed that the 100–1,000 denier (Dr) synthetic fiber monofilaments to be used in accordance with the technique disclosed in said Japanese Kokai Tokkyo Koho No. 8664/84 indeed show good reinforcing property but are disadvantageous in that they have poor dispersibility and cause decrease in the flowability of mortar and the like, hence they offer workability problems. As a result of various investigations to cope with the problems, it was concluded that a fineness of not less than 1,000 Dr is essential. In the art, however, no technique was available for the production of synthetic fiber monofilaments having a fineness of not less than 1,000 Dr and a high tenacity necessary for reinforcing purposes.

As a synthetic fiber monofilament species having a fineness of not less than 1,000 Dr, a polyethylene fiber (BONFIX®; 0.9 mm in mean diameter) is commercially avilable. However, the reinforcing effect of this fiber is unsatisfactory because of its low strength, although the workability and other features of the fiber are good. The present inventors, too, made intensive investigations in an attempt to develop a technique of producing high tenacity monofilaments having a fineness of not less than 1,000 Dr using polyvinyl alcohol (hereinafter referred to as "PVA"), but in vain.

Owing to these circumstances, the present inventors attempted to improve the state of art by bundling fine-denier filaments which can be bestowed with high tenacity rather easily. Thus, as proposed in Japanese Kokai Tokkyo Koho No. 21559/85, a technique was provided by the present inventors which comprises twisting multifilaments each composed of high-tenacity, finedenier filaments, binding the fine-denier filaments with a hydrophobic resin, and incorporating the thusobtained fiber bundle yarns having a fineness of up to 5,000 Dr into mortar and the like. Since said fiber bundle yarns will not be separated into single fibers even in the step of kneading with mortar and the like, good dispersibility can be attained and the workability problems can be solved. However, coating of the surface of a PVA fiber, which is by nature good in adhesion to mortar and the like, with a hydrophobic resin results in decreased adhesion to mortar and the like and, as a result, the reinforcing property of the fiber bundle yarns is unsatisfactory in spite of the fact that said yarns themselves have high tenacity. In addition, twisting of multifilaments, treating them with a binding agent, drying them and curing them are required for the production of said fiber bundle yarns. The number of production steps is thus increased and, moreover, the productivity is low, hence the production cost is increased. This is a particularly great obstacle from the practicability viewpoint.

As mentioned above, no fiber has been found to be satisfactory as a reinforcing fiber for mortar and the like when evaluated in terms of reinforcing property and workability. Appearance of a satisfactory reinforcing fiber for mortar and the like has earnestly been waited for in the art.

SUMMARY OF THE INVENTION

The present inventors considered that, as will be apparent from the foregoing, development of high-tenacity synthetic fiber monofilaments having a fineness exceeding 1,000 Dr, in particular PVA monofilaments markedly good in adhesion to mortar and the like, which have such characteristic features, would be essential for the solution of the problems mentioned above, and they made intensive investigations to develop such monofilaments. As a result, they have now completed the present invention.

The means of solving the problems, namely the essential point in the constitution of the present invention consists in coarse-denier, high-tenacity synthetic fiber monofilaments, in particular coarsedenier, high-tenacity PVA monofilaments, which have the following characteristic features:

(1) A flat fiber cross-section in which the minor axis-to-major-axis ratio (hereinafter referred to "flatness" for short) is 1:2 to 1:10;
(2) A fineness of 1,000–9,000 Dr;
(3) A strength of not less than 80 kg/mm$^2$ and Young's modulus of not less than 2,300 kg/mm$^2$; and
(4) An aspect ratio of 20–150.

It is now possible to solve all the problems encountered in the prior art by admixing 0.1–4% by volume of synthetic fiber monofilaments, in particular PVA monofilaments, having such characteristics with mortar and the like in ordinary use. Thus, the invention provides an epoch-making technique which is excellent with respect to workability, inclusive of dispersibility, and reinforcing property as well as with respect to economy, the most important matter from the practical viewpoint.

DETAILED DESCRIPTION OF THE PREFERRED EMBODIMENTS

The most important task given to the inventors, namely to produce high tenacity monofilaments having a coarse fineness of not less than 1,000 Dr, a tensile strength of not less than 80 kg/mm$^2$ and Young's moduls of not less than 2,300 kg/mm$^2$, can now surprisingly be performed by making fibers flat to a flatness of 1:2 to 1:10.

As example of the production of such coarse-denier flat PVA monofilaments is described in the following. PVA having a degree of polymerization of 1,000–6,000 and a degree of saponification of not less than 99.8% is made up into a form of hydrous or moist chips with a PVA concentration of 40-60% by weight, melted in an extruder and spun into air by the dry method from a flat nozzle opening shaped such that a flatness of 1:2 to 1:10 is attained. Thereafter, the filaments spun are dried until almost absolute dryness, drawn in a hot air drawing chamber or oven at 200°-250° C. at a draw ratio of not less than 8, preferably not less than 10, and heat-treated as necessary under constant length conditions or under shrinking conditions. The spinning nozzle should have a cross-section such that filaments having a fineness of 1,000-9,000 Dr can readily be obtained after drawing and heat treatment, and the rate of discharge of the spinning solution of PVA should be adjusted depending on the fineness (Dr) and draw ratio. The thus-obtained coarse-denier, flat PVA monofilaments have a tensile strength of not less than 80 kg/mm$^2$ and Young's modulus of not less than 2,300 kg/mm$^2$, which are required for their use in reinforcing mortar and the like. PVA monofilaments obtained by the ordinary dry spinning method are produced through a spinning nozzle opening having a circular cross section and have an approximately circular cross-section, with the flatness being at most 1:1.8. Filaments having such cross-section and a fineness of not less than 1,000 Dr cannot have a high strength of not less than 80 kg/mm$^2$ by any means. It is possible to obtain the desired filaments only when the flatness is not less than 1:2. The reason for that is not yet clear. It may be conceivable that because of the flat cross section, the filaments are rendered uniform by drying and coagulation in the step of spinning, drying after spinning, drawing and heat treatment, and so forth. However, the effect of flattening on the tenacity is too great to be explained by such conception.

Although PVA fibers are generally spun by the wet method, the wet spinning method fails to give coarse-denier, high-tenacity PVA monofilaments because the coagulation conditions, typically the rate of coagulation, greatly differ between the fiber surface and the fiber inside in wet spinning.

The most preferred example of the synthetic fiber according to the invention is a PVA fiber in view of its good adhesiveness to cement and its good alkali resistance. Another preferred example is a polyacrylonitrile fiber. When the polyacrylonitrile fiber meets the above-mentioned requirements concerning the fineness, strength, Young's modulus, aspect ratio and flatness, it has good mortar reinforcing property but is inferior to the PVA fiber in respect of efficacy.

The flatness is required to be at least 1:2. A flatness exceeding 1:10 is unfavorable. The cross-section flattening is doubly effective in increasing the fiber tenacity and in increasing the surface area per unit volume to thereby improve the adhesion to mortar and the like and increase the reinforcing effect. So far it has been thought in the art that the addition of coarse-denier fibers to mortar and the like as reinforcing fibers without increasing the addition level would be unfavorable from the reinforcing property viewpoint because of the resulting decrease in the number of fibers added. On the contrary, the cross-section flattening as specified herein results in very good reinforcing effect in spite of the decrease in the number of fibers added. A flatness below 1:2 cannot contribute to increase in the tenacity of coarse-denier synthetic fiber monofilaments or to improvement in the adhesion to mortar and the like as compared with the circular cross-section. At a flatness exceeding 1:10, splitting takes place unfavorably in the steps of drawing, winding up and kneading with mortar and the like, among others, giving fine-denier monofilaments or fibers. A preferred flatness is within the range of 1:2.5 to 1:5 and a preferred fineness is within the range of 1,200-4,000 Dr. The flatness is defined as the ratio of the minor axis to the major axis, as already mentioned hereinbefore, and the shape of the cross-section is optional, hence may be rectangular, oval or elliptic, or cocoon-shaped, for instance, provided that the flatness is within the range specified herein.

For the requirements with respect to workability and reinforcing property simultaneously, the coarse-denier synthetic fiber monofilaments, such as mentioned above, to be admixed with mortar and the like are required to have an adequate aspect ratio (value obtained by dividing the fiber length by the diameter of a circle equivalent in area to the fiber cross-section) within a preferred range of 20-150. When the aspect ratio is below 20, the reinforcing effect is not obtained because of fiber slipping off from set mortar and the like compositions although good workability can be obtained since the dispersibility in kneading with mortar and the like is good and the slump loss is slight. Conversely, when the aspect ratio is in excess of 150, the workability becomes unfavorably worsened. A more preferred aspect ratio is within the range of 40-100.

Such fiber is added to intrinsically brittle materials containing a hydraulic material, such as cement, as the binder. Usable as said binder are portland species in ordinary use, more specifically normal portland cement, high-early-strength portland cement, moderate heat portland cement, sulfate resisting portland cement and white portland cement. Blended or mixed cement species are also usable without any particular limitation and, for example, portland blast-furnace slag cement, silica cement, fly-ash cement, alumina cement, expansive cement and ultra high-early-strength portland cement can be used. Furthermore, such binders as gypsum-slag binders and magnesia can also be used.

Sand, crushed sand and crushed stone of the river, sea or land origin are used as fine aggregates. Broken stone and crushed stone are used as coarse aggregates. Furthermore, lightweight artificial aggregates and/or fillers such as slag, limestone, expanded perlite, expanded obsidian, expanded shale, calcium carbonate, vermiculite and silas (or shirasu) balloon are also usable.

Air-entraining agents (AE agents), flowability improving agents, water reducing agents, thickeners, water retaining agents, water repellents and expanding agents may also be used as additives or admixtures.

Hardening accelerators so far in use, such as sodium sulfate, gypsum, sodium carbonate, calcium carbonate, triethanolamine and calcium chloride, can also be used.

Sodium silicate, potassium bichromate and sodium silicofluoride are usable as setting accelerators. For spray works, crack repair and the like, additives or admixtures containing a powdery or liquid accelerator, such as sodium carbonate or sodium aluminate, as the main component can also be used.

Ligninsulfonic acid salts and hydroxycarboxylic acids, which are setting retarders, as well as inorganic retarders such as magnesium silicofluoride can be used.

The fiber of the invention as mentioned above is added to a hydraulic substance, such as cement, suitably in an amount of 0.1-4% by volume. At addition levels below 0.1% by volume, the addition of said fiber is meaningless since no reinforcing effect can be obtained, although the workability is good because of the low level addition of the fiber. At levels exceeding 4% by volume the fiber volume is excessive; the kneadability of mortar or the like becomes worsened and, furthermore, separation of the fiber from aggregates or mortar or bleeding of the fiber may take place, rendering working impracticable. The addition level at which the desired reinforcing effect can be produced without impairing the workability of mortar of the like is within the range of 0.1-4% by volume, preferably 0.5-3% by volume.

It has been found that when the fiber according to the invention is mixed with cement mortar by kneading, the change in flow and decrease in slump each as a function of time after placement are slight advantageously from the working viewpoint and, furthermore, from the reinforcement viewpoint, the bending strength is increased to twice to three times that of the unmixed control at a low level of addition of said fiber, the toughness being increased by, say 50-60 times, as estimated from the bending stress-strain curve.

These performance characteristics can be widely utilized in materials of construction in the fields of building and civil engineering.

Firstly, in the field of building, the fiber of the invention can be used in exterior building materials from cement mortar or from lightweight mortar compositions aerated or containing lightweight aggregates. Said exterior building materials are, for example, shell structures (such as shingles), curtainwalls, exterior panels, molded roofing materials, parapets, spandrels and exterior reliefs. Said fiber can also be used in interior building materials such as partition wall materials, wall materials, reliefs, flooring materials, free access floor materials and ceilings. The fiber can be used further in forms or molds, disposable or permanent forms or molds, floor boards, girder, foundations for machinery, foundations for housing, nuclear reactor housing, liquefied petroleum gas containers or tanks, containers or tanks for petroleum, heavy oils and the like, and stairway construction materials.

Secondly, the fiber can be used in secondary concrete products such as mold-shaped sheet piles, hollow cylindrical products, for example pipes, piles and poles, and so forth. The fiber can be used in concrete products for road making, such as flat concrete boards for footways, reinforced concrete U shapes, concrete or reinforced concrete L shapes, concrete boundary blocks and reinforced concrete guardrails. The fiber can be used in pipes and tubes, such as reinforced concrete pipes formed by centrifugal molding, and further span pipes with socket, reinforced concrete pipes, rolled reinforced concrete pipes, plain concrete pipes, core-type restressed concrete pipes, asbestos cement pipes for aqueduct, cable pipes, cable ducts, sewage pipes and products for irrigation and drainage. The fiber can be used in road construction materials such as sound insulating wall materials, street signs, pavement reinforcements, side ditches, tunnel interior materials and piles. Whereas steel reinforcements and steel fibers, when used in marine buildings, may cause troubles due to rusting resulting from invasion of seawater and accordingly are disadvantageous from the long-term use viewpoint, the fiber according to the invention does not undergo rusting and therefore can be effectively used in materials for constructing marine and coast structures. The fiber can be used also in thin shell ferroconcrete structures, such as ship equipment and boats, bouys, floating piers, gathering places for fish, tetrapods and the like wavebreaking blocks, and bank protecting blocks. In the field of agriculture and the like, the fiber can be used in tanks, silos, seedbeds, fence pots, vases, flower pots, sheet piles for side ditches, and so forth. Furthermore, it can be used in materials of containers for disposal of waste matters such as radioactive waste matters.

Thirdly, in the field of civil engineering, the fiber can be used in concrete road pavements, inclusive of ordinary roads and airport runways. In this field, the use of the fiber as a reinforcement is effective in improving the bending strength, shock resistance and wear resistance and enables omission of steel reinforcements or reduction in the quantity of steel reinforcements, reduction in the thickness of concrete floorings and/or, furthermore, reduction in the term of works and/or in raw material quantity. The fiber of the invention can be used in materials for railway construction, such as sleepers and gangboards at railroad crossings, whereby noise generation in communication and communication troubles due to short circuit, electric leakage etc., as caused by the presence of steel reinforcements or steel fibers used in sleepers or gangboards, as well as magnetic troubles in linear motor car transportation systems as caused by iron in sleepers can be eliminated. The fiber can be used in slope protection by spraying or in spraying tunnels. The fiber can be used widely in construction or producing earthquake-proof structures and waterproof structures for bridge building, for example bridge piers, slabs and beam products, such as prestressed concrete beams for slab bridges, prestressed concrete beams for girder bridges, prestressed concrete beams for light load slab bridges, and prestressed concrete double T slabs. Furthermore, it can be used, among others, in overlays, pavements for pedestrian bridges, pavements for bridge floors, and repairing materials therefor as well as footway pavements.

Fourthly, the fiber of the invention can be added to cement mortar molding materials to be molded by extrusion, which is a special molding method, so that the bending strength and shock resistance can be improved. Said fiber can further be added to mortar compositions for spraying or for application to walls for improvement in shock resistance and flexural strength and, of course, for crack prevention. There is no particular limitation on the cement mortar or concrete compositions to which the fiber of the invention can be used.

The following working examples and comparative examples are further illustrative of the present invention.

EXAMPLE 1 AND COMPARATIVE EXAMPLES 1-4

PVA having a degree of saponification of 99.9 mole percent and a viscosity average degree of polymerization of 1,700 was made up into a form of moist chips with a PVA concentration of 52%. The moist material was discharged form a nozzle having the discharge opening shape specified in Table 1 into air, absolutely dried, drawn in a hot air drawing oven at 235° C. and then heat-treated in a heat treatment oven at 230° C. under constant length conditions to give a fiber having the physical characteristics, cross-sectional shape and cross-sectional flatness shown in Table 1. In Comparative Examples 1-4, fibers were produced in the same manner as in Example 1 except that the nozzle shape, draw ratio and/or fineness (Dr) was varied.

TABLE 1

| Example and Comparative Example | Nozzle shape | Draw ratio (times) | Denier (Dr) | Tensile strength (kg/cm$^2$) | Young's modulus (kg/cm$^2$) | Cross-section Shape | Flatness | Remarks |
| --- | --- | --- | --- | --- | --- | --- | --- | --- |
| Example 1 | Rectangular | 11.5 | 1,500 | 98 | 3,200 | Flat | 1:3.3 | |
| Comparative Example 1 | Rectangular | 7.5 | 1,500 | 74 | 1,520 | Flat | 1:3.5 | |
| Comparative Example 2 | Circular | 9.5 | 1,500 | 76 | 1,990 | Elliptic | 1:1.7 | Intense foaming during drying; frequent fiber breaks upon drawing |
| Comparative Example 3 | Rectangular | 11.5 | 1,500 | 94 | 2,930 | Flat | 1:11 | Frequent fiber splittings |
| Comparative Example 4 | Circular | 11.5 | 350 | 96 | 3,160 | Elliptic | 1:1.8 | |

In Example 1, which is an embodiment of the invention, spinning, drying and drawing could be conducted stably, giving monofilaments having highly desirable fiber characteristics since the cross-section flatness was within the range specified herein. In Comparative Example 1, the draw ratio was below the range specified herein and the fiber strength and Young's modulus were low. In Comparative Example 2 in which the cross-section had an elliptic shape with a lower degree of flatness than specified herein, fiber production was difficult because of frequent breaks during drawing as possibly caused by intense foaming during fiber drying and the desirable fiber characteristics could not be obtained. In Comparative Example 3, in which the cross-section of the fiber produced was rectangular and highly flat, stable production of the fiber could not be carried out due to splitting of monofilaments in the steps of drawing and winding up and further in the step of cutting thereof. The fiber showed hangnail-like appearances at the sites of splitting and, upon handling, turned into fiber balls, so that kneading thereof with cement was impossible. In Comparative Example 4, the fiber was a fine-denier one having an elliptic cross-section with a lower flatness than specified herein.

EXAMPLES 2–4 AND COMPARATIVE EXAMPLES 5–9

The fibers of Example 1 and Comparative Examples 1, 2 and 4 were cut to the respective aspect ratios given in Table 2 to give reinforcing fibers. These reinforcing fibers were used in preparing cement mortar compositions. The fiber addition level, the formulation, and the conditions of kneading, molding and curing were as described below. For comparison, a plain control run (Comparative Example 5) without fiber addition was made in the same manner as the other examples.

(1) Formulation:

| | |
| --- | --- |
| Cement: Onoda Cement's high-early-strength portland cement: | 3.0 kg |
| Fine aggregate: Iwami silica sand No. 6.5 | 3.0 kg |
| Additive: Mighty 150 ®: | 30 g |
| Water: Okayama City tap water: | 1.11 kg |
| Fiber: | |
| 1% by volume = | 42 g |
| 2% by volume = | 84 g |

(2) Kneading: The above cement and fine aggregate were blended thoroughly in an omnimixer for 2 minutes, then the water and Mighty 150 were added and, after 2 minutes of kneading, the fiber was added (1% or 2% by volume), and the whole mixture was kneaded for 3 minutes.

(3) Molding: Molding was performed in the manner of casting into a mold 5 cm (thickness)×24 cm (width)×24 cm (length) in size.

(4) Mold release and curing: After standing in a room under conditions of 25° C. and 65% RH for 24 hours following molding, mold release was conducted and the molding was cured in air for 2 weeks.

The dispersibility of each fiber during kneading was observed or workability evaluation, and the flow, which is indicative of the flowability, hence workability, and the bending strength, which is indicative of the reinforcing effect, were measured respectively by the methods mentioned below. The results thus obtained are shown in Table 2.

(1) Dispersibility: For evaluating the dispersibility of the fiber, the method of JIS A 1103 was used. Thus, each mortar was taken on a 20-mesh wire net, the cement and sand were washed off in water, and the state of dispersion of the fiber on the wire net was evaluated by the eye. The dispersibility was evaluated as follows:

| | |
| --- | --- |
| Very good dispersibility | ⊙ |
| Good dispersibility | ○ |
| Fiber entanglement to some extent | △ |
| Fiber balls observed | X |

(2) Flow: The value of flow was determined by the testing method of JIS R 5201.

(3) Bending strength: After curing, a test piece 5 cm in thickness, 5 cm in width and 24 cm in length was cut out and tested on an Instron TTCM tester by the center loading method using a span of 10 cm, and the crack strength was evaluated from the load-deflection curve in terms of the so-called limit of proportionality (LOP) strength and the subsequent peak value attributable to the reinforcing fiber in terms of modulus of rupture (MOR).

TABLE 2

| Example and Comparative Example | Level of fiber addition (vol. %) | Fiber Aspect ratio | Fiber Length (mm) | Workability Fiber dispersibility | Flow (cm) | Bending strength LOP (kg/cm$^2$) | Bending strength MOR (kg/cm$^2$) | Fiber used |
|---|---|---|---|---|---|---|---|---|
| Example 2 | 1 | 60 | 25 | ⊚ | 17.0 | 55 | 100 | Example 1 |
| Example 3 | 1 | 86 | 35 | ⊚ | 16.1 | 70 | 120 | " |
| Example 4 | 2 | 86 | 35 | ⊚ | 15.3 | 90 | 150 | " |
| Comparative 5 | 0 | — | — | ⊚ | 18.5 | 48 | — | |
| Comparative 6 | 1 | 200 | 80 | x | 11.0 | 50 | 78 | Example 1 |
| Comparative 7 | 1 | 86 | 35 | ○ | 16.0 | 48 | 60 | Comparative Example 1 |
| Comparative 8 | 1 | 86 | 35 | ○ | 16.5 | 47 | 83 | Comparative Example 2 |
| Comparative 9 | 1 | 86 | 17 | △ | 14.0 | 50 | 75 | Comparative Example 4 |

In Examples 2–4, the fiber of the invention was used and showed good workability as evaluated in terms of fiber dispersibility and flow, among others, and produced great and excellent reinforcing effect as evaluated with respect to bending strength in terms of LOP and MOR.

On the other hand, in Comparative Example 6, in which the fiber obtained in Example 1 was used but at a greater aspect ratio, namely in a greater fiber length, the fiber dispersibility was poor and fiber balls were formed and accordingly, satisfactory moldings could not be obtained. In Comparative Example 7, the fiber of Comparative Example 1 was used but the fiber strength was low, so that any substantial reinforcing effect could not be obtained. In Comparative Example 8, in which the fiber of Comparative Example 2 was used, the fiber had an elliptic cross-section and a low fiber strength and failed to produce any substantial reinforcing effect. In Comparative Example 9, in which the fiber of Comparative Example 4 was used, the fiber dispersibility was poor, the decrease in flow was great, the workability was thus unsatisfactory, and failed to produce any substantial reinforcing effect.

EXAMPLES 5 AND 6 AND COMPARATIVE EXAMPLES 10–15

For workability and reinforcing effect evaluation with respect to a concrete formulation, crushed stone (maximum grain size: 20 mm) was used as a coarse aggregate, Iwami silica sand No. 5 was used as a fine aggregate, a fine aggregate proportion of 0.6 was used, and a concrete composition was prepared by kneading in a tilting mixer for 10 minutes in accordance with the following formulation: W/C=0.55, water 210 kg, cement 383 kg, fine aggregate 900 kg, crushed stone 600 kg, Mighty 150 (Kao Corporation) as AE agent 1.0% based on cement, desired air content 5%. The PVA fiber produced in Example 1 as cut to a fiber length specified in Table 3 was added to such fresh concrete. In Examples 5 and 6, the fiber produced in Example 1 according to the invention was used. In Comparative Example 11 and 12, the fibers of Comparative Examples 2 and 4 were used respectively. In Comparative Examples 13–15, RMS182×30p (Kuraray's fiber bundle yarn; 1,000 monofilaments (1.5 denier) bundled and bound with a melamine resin), a polyethylene fiber (BONFIX; Mitsui Petrochemical Industries, Ltd.; tensile strength 26 kg/mm$^2$) and a steel fiber (SHINKOFIBER; Kobe Steel, Ltd.) were added in an amount of 1% by volume, respectively. In Comparative Example 10, fiber addition was omitted. Each fresh concrete was cast into a mold 10×20×40 cm in size, allowed to harden in humid air at 20° C. for 24 hours and then cured in water at 20° C. After 28 days of curing, the bending strength and compressive strength were determined using a Shimadzu model RH-200 universal testing machine. In bending strength measurement, a span of 30 cm was used according to JIS A 1106 and the bisectional loading method was used, and the LOP and MOR were determined from the bending stress-deflection curve. The slump value was determined by the method of JIS A 1101 and the air content by the method of JIS A 1128. The dispersibility was evaluated according to the same criteria as used in Example 2.

TABLE 3

| | Fiber used | Fiber Aspect ratio | Fiber Length | Workability Fiber dispersibility | Slump (cm) | Amount of air (%) | Bending strength LOP (kg/cm$^2$) | Bending strength MOR (kg/cm$^2$) |
|---|---|---|---|---|---|---|---|---|
| Example 5 | Example 1 | 60 | 25 | ⊚ | 11 | 6.2 | 65 | 75 |
| Example 6 | Example 1 | 85 | 35 | ○ | 10 | 6.3 | 68 | 80 |
| Comparative Example 10 | — | — | — | — | 19.5 | 6.0 | 63 | — |
| Comparative Example 11 | Comparative Example 2 | 86 | 35 | ○ | 11 | 6.3 | 60 | 40 |
| Comparative Example 12 | Comparative Example 4 | 86 | 17 | x | 5 | 6.9 | 62 | 45 |
| Comparative Example 13 | RMS182 × 30P | 60 | 30 | ○ | 12 | 6.3 | 60 | 43 |
| Comparative Example 14 | BONFIX | 33 | 30 | ○ | 17 | 6.2 | 57 | 21 |
| Comparative Example 15 | Steel fiber | 50 | 25 | ○ | 12 | 6.1 | 70 | 71 |

In Example 5 and 6, the workability was evaluated as being good from the dispersibility and slump value observed, high crack strength (LOP) and postcrack modulus of rupture (MOR) values were obtained in the bending strength test; the reinforcing effect was excellent.

In Comparative Example 11, no substantial reinforcing effect was produced, although the workability was good. In Comparative Example 12, the fiber dispersibility was unsatisfactory, fiber balls formed in fresh concrete, and the fiber used was thus unsatisfactory from the viewpoints of workability and reinforcing effect. In Comparative Example 13, the reinforcing effect was insufficient. In Comparative Example 14, in which a polyethylene fiber was used, the fiber dispersibility was good and the slump was small, hence the workability was good but the reinforcing effect was inferior because of low fiber strength. In comparative Example 15, in which a steel fiber was used, the workability and reinforcing effect were rather satisfactory but, upon long-term standing in water, rusting took place from the surface.

EXAMPLE 7 AND COMPARATIVE EXAMPLES 16 AND 17

A two-shaft compulsion mixer was charged with 193 kg of normal portland cement, 1,113 kg of Kisarazu mountain sand (as fine aggregate), 611 kg of Hachioji No. 6 crushed stone (maximum diameter 13 mm) (as coarse aggregate), 350 kg of water (W/C=0.55) and 0.88 kg of Pozzolith No. 70 ® (as water reducing agent), and the mixture was kneaded to give a plain concrete mix (Comparative Example 16).

The fiber produced in Example 1 in accordance with the invention was cut to a length of 30 mm and added, in an amount of 1% by volume, to the plain concrete prepared in the above manner (Example 7). For comparison, a steel fiber having a 0.5mm×0.5 mm square cross-section and a length of 25 mm was added in an amount of 1% by volume (Comparative Example 17). After fiber addition, kneading was performed for about 30 seconds and the slump and air content were measured. For each hardened concrete, the bending strength and bending toughness as well the compressive strength and compressive toughness were determined. For the bending and compression tests, an Amsler type tester was used. In determining the bending strength and bending toughness, a span of 30 cm and the trisectional loading mode were used. The bending strength was determined from the bending stress-deflection curve, and the bending toughness from the area corresponding to a deflection of 1/150 in the middle of the span. The compressive strength was determined from the load-deformation curve and the compressive toughness from the area corresponding to a displacement of 0.75% was calculated as a strain. The test moldings had a rectangular parallelepiped form 10 cm×10 cm×40 cm in size for bending strength testing or a cylindrical form 10 cm(diameter)×20 cm(height).in size for compressive strength testing. Their age when either test was performed was 7 days. The results thus obtained are shown in Table 4.

TABLE 4

| | Air content (%) | Slump (cm) | Bending | | Compressive | |
|---|---|---|---|---|---|---|
| | | | Strength (kgf/cm$^2$) | Toughness (kgf/cm) | Strength (kgf/cm$^2$) | Toughness (kgf/cm) |
| Example 7 | 4 | 4.0 | 52.7 | 264 | 320 | 1,336 |
| Comparative Example 16 | 4 | 19.5 | 35.8 | 135 | 289 | 1,014 |
| Comparative Example 17 | 4 | 13.5 | 41.9 | 209 | 303 | 1,257 |

The bending strength and toughness and compressive strength and toughness obtained in Example 7 in which the PVA fiber of the invention was used were superior to those obtained in Comparative Example 17 in which a steel fiber was used, and showed by far superior reinforcing effect as compared with the plain concrete (Comparative Example 16).

What is claimed is:

1. A synthetic monofilament of polyvinyl alcohol suited for use as a reinforcement for cement mortar or concrete having a tensile strength of not less than 80 kg/mm$^2$, Young's modulus of not less than 2,300 kg/mm$^2$, a flat cross section in which the minor axis-to-major axis ratio is 1:2 to 1:10, and a fineness of 1,000-9,000 denier, and being cut to a length such that the aspect ratio is 20-150.

2. The synthetic monofilament of claim 1, having a flat cross section in which the minor-to-major axis ratio is 1:2.5 to 1:5, a fineness of 1,200-4,000 denier, and an aspect ratio of 40-100.

* * * * *